(12) United States Patent
Roberts (10) Patent No.: US 7,150,593 B2
(45) Date of Patent: Dec. 19, 2006

(54) SEALING PLUG FOR BLIND INSTALLATION

(75) Inventor: Andrew Roberts, Ware (GB)

(73) Assignee: Textron Fastening Systems Limited (GB)

( * ) Notice: Subject to any disclaimer, the term of this patent is extended or adjusted under 35 U.S.C. 154(b) by 133 days.

(21) Appl. No.: 10/493,262

(22) PCT Filed: Aug. 13, 2002

(86) PCT No.: PCT/GB02/03771

§ 371 (c)(1),
(2), (4) Date: Aug. 9, 2004

(87) PCT Pub. No.: WO03/036155

PCT Pub. Date: May 1, 2003

(65) Prior Publication Data

US 2005/0008454 A1    Jan. 13, 2005

(30) Foreign Application Priority Data

Oct. 23, 2001   (GB) ................................ 0125407.7

(51) Int. Cl.
*F16B 19/08*    (2006.01)

(52) U.S. Cl. .................... 411/34; 411/371.1; 138/89

(58) Field of Classification Search ............ 411/34, 411/371.1; 138/89; 220/234

See application file for complete search history.

(56) References Cited

U.S. PATENT DOCUMENTS

| | | | | |
|---|---|---|---|---|
| 3,525,365 A | * | 8/1970 | Boyle et al. ............ | 138/89 |
| 4,091,841 A | | 5/1978 | Beneker et al. | |
| 4,875,818 A | * | 10/1989 | Reinwall ............... | 411/369 |
| 4,982,763 A | * | 1/1991 | Klahn ................... | 138/89 |

(Continued)

FOREIGN PATENT DOCUMENTS

GB    1207790    * 10/1970

(Continued)

OTHER PUBLICATIONS

European Search Report dated Apr. 16, 2002 which issued in connection with a corresponding European application.

(Continued)

*Primary Examiner*—Katherine Mitchell
(74) *Attorney, Agent, or Firm*—Trexler, Bushnell, Giangiorgi, Blackstone & Marr, Ltd.

(57) ABSTRACT

A sealing plug for blind installation in a suitable hole thereby to plug and seal the hole, which sealing plug has a sleeve (1); a stem (2) having a head at least part of which is radially enlarged with respect to the remainder of the stem (2); the stem head (4) having a shoulder, the shoulder being provided with an annular protrusion (9); the stem (2) protruding from one end of the sleeve (1), and the annular protrusion (9) abutting the other end of the sleeve (1); the stem head (4) being of a material which is harder than that of the sleeve (1) and being formed with a weakened portion (3) intermediate the head (4) and the part of the stem remote therefrom; whereby, when the sealing plug is inserted in a suitable hole, with the sleeve (1) entirely within the hole, and increasing force is applied to the stem (2) with respect to the sleeve (1), axial compression is applied by the shoulder to the sleeve material abutting it, thereby causing the annular protrusion (9) on the stem head (4) to embed into the sleeve (1), and the sleeve to deform and expand radially to engage with the wall of the hole, and thereafter the stem (2) breaks at the weakened portion so that the head (4) remains in the sleeve (1).

4 Claims, 7 Drawing Sheets

U.S. PATENT DOCUMENTS 5,347,708 A * 9/1994 Bischoff et al. ............... 29/825
5,437,310 A * 8/1995 Cunningham ................ 138/89
6,966,342 B1 * 11/2005 Denham ...................... 138/89

FOREIGN PATENT DOCUMENTS

| GB | 1249517 | 10/1971 |
| GB | 2094928 | 9/1982 |
| GB | 2362201 | 11/2001 |
| WO | WO 98/22745 | 5/1998 |

OTHER PUBLICATIONS

International Search Report dated Oct. 11, 2002 which issued in connection with a corresponding PCT application.

* cited by examiner

SEALING PLUG FOR BLIND INSTALLATION

RELATED/PRIORITY APPLICATION

This application is a National Phase filing regarding International Application No. PCT/GB02/03771, which relies upon British Application No. 0125407.7 for priority.

The invention relates to a sealing plug for blind installation in a suitable hole thereby to plug and seal it, e.g. against high-pressure fluids. Blind installation means that the plug is installed by access through only one end of the hole.

Known types of such sealing plugs (e.g. those available under the trademarks AVSEAL and KOENIG HK) comprise a hollow cylindrical sleeve and a stem with a tapered head portion which is drawn into the sleeve causing it to expand radially until it fills the hole.

A disadvantage of this type of plug is that the permissible difference in diameter between the hole which is to be plugged, and the outside diameter of the plug sleeve before installation, is relatively small. This creates a number of problems. Thus, the range of hole sizes which can be successfully sealed by identical plugs is restricted so that in practice a range of plugs of different sizes are needed. Further, where automatic machines are used to install plugs into workpieces, the holes in the workpieces must be positioned very accurately relative to a fixed datum, and the automatic plug installation machine must also be capable of accurately aligning the plug with the hole during the insertion phase of the installation cycle. If this is not achieved, then there is a risk of the plug colliding with the workpiece during insertion, which could damage the surface of the plug or the surface of the hole in the workpiece. Either case could result in a defectively installed plug, which in turn could cause fluid leakage from the improperly plugged hole.

One object of the present invention is to provide a sealing plug which overcomes these problems.

Accordingly, the present invention provides, in one of its aspects, a sealing plug as defined in Claim 1.

Other features of the invention are set out in the further claims.

A specific embodiment of the invention will now be described by way of example and with reference to the accompanying drawings, in which.

Figure 1:
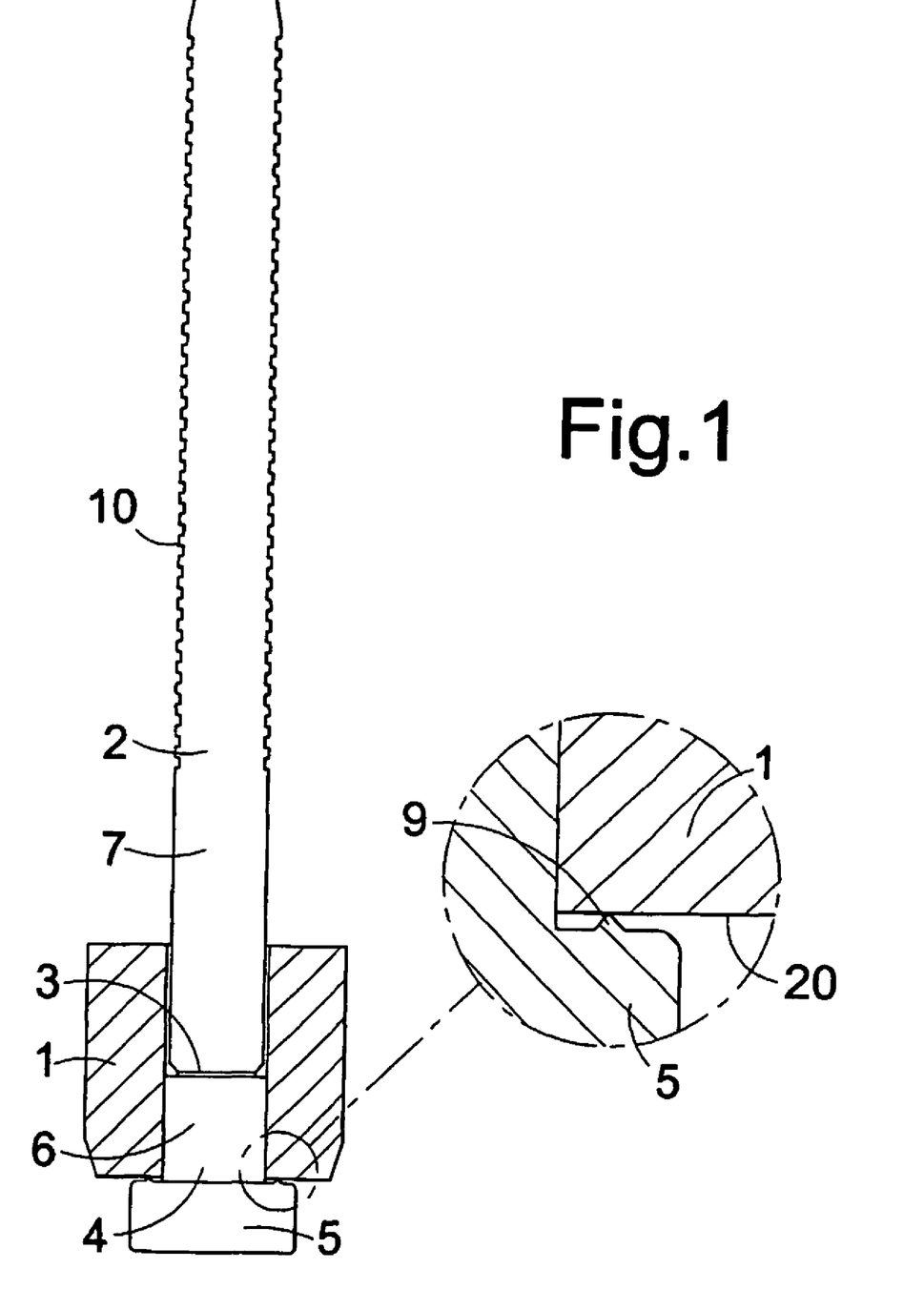
FIGS. 1 to 6 are sections through a sealing plug, showing successive stages in the installation of the plug.

Referring to FIG. 1, the plug comprises a sleeve 1 and a stem 2 which has a weakened portion in the form of a breakneck 3. The stem head 4 has an enlarged portion 5 and an intermediate portion 6 adjacent the breakneck 3, which intermediate portion is slightly larger in diameter than the pulling portion 7 of the stem. The transition between the enlarged portion 5 and the intermediate portion 6 provides a shoulder 8, which has a protrusion or raised portion in the form of an annular ring 9. In this example the raised ring is of tapering cross-section, as illustrated in the enlarged part of FIG. 1.

The stem pulling portion 7 has conventional pulling grooves 10 for engagement with a conventional blind riveting tool. The sleeve 1 is manufactured from relatively soft material such as aluminium, and the stem 2 is made from relatively hard material such as steel. The sleeve 1 is assembled on to the stem 2 in such a way that projecting annular ring 9 abuts against the end face 20 of the sleeve 1.

Figure 2:
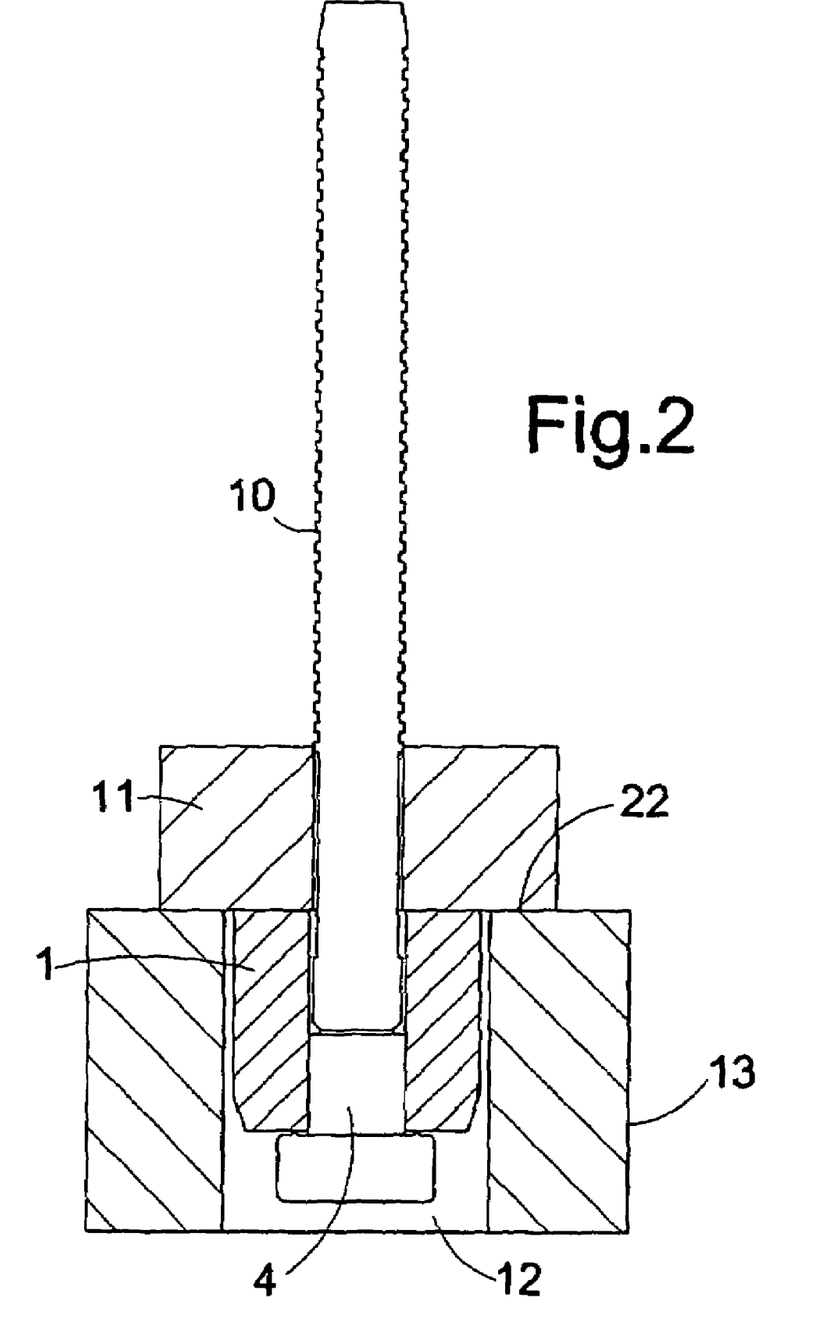

FIG. 2 shows the plug engaged in an installation tool of which the annular nosepiece 11 is the leading part (the remainder of the tool is not illustrated) and abuts against the face 22 of the workpiece 13, around the hole 12 which is to be plugged. The head 4 and sleeve 1 of the plug are entirely within the hole 12 which is to be plugged. The head 4 and sleeve 1 of the plug are entirely within the hole 12. The installation tool is of the type commonly used to install breakstem rivets or lockbolts. It includes pulling jaws (not shown) for gripping the protruding plug stem by engaging the pulling grooves 10, the jaws being retracted away from the nosepiece 11. The nosepiece reaction force is taken up against the end of the sleeve remote from the head 4, so that as an increasing tension force is applied to the stem 2, an increasing compression force is applied to the sleeve 1.

Figure 3:
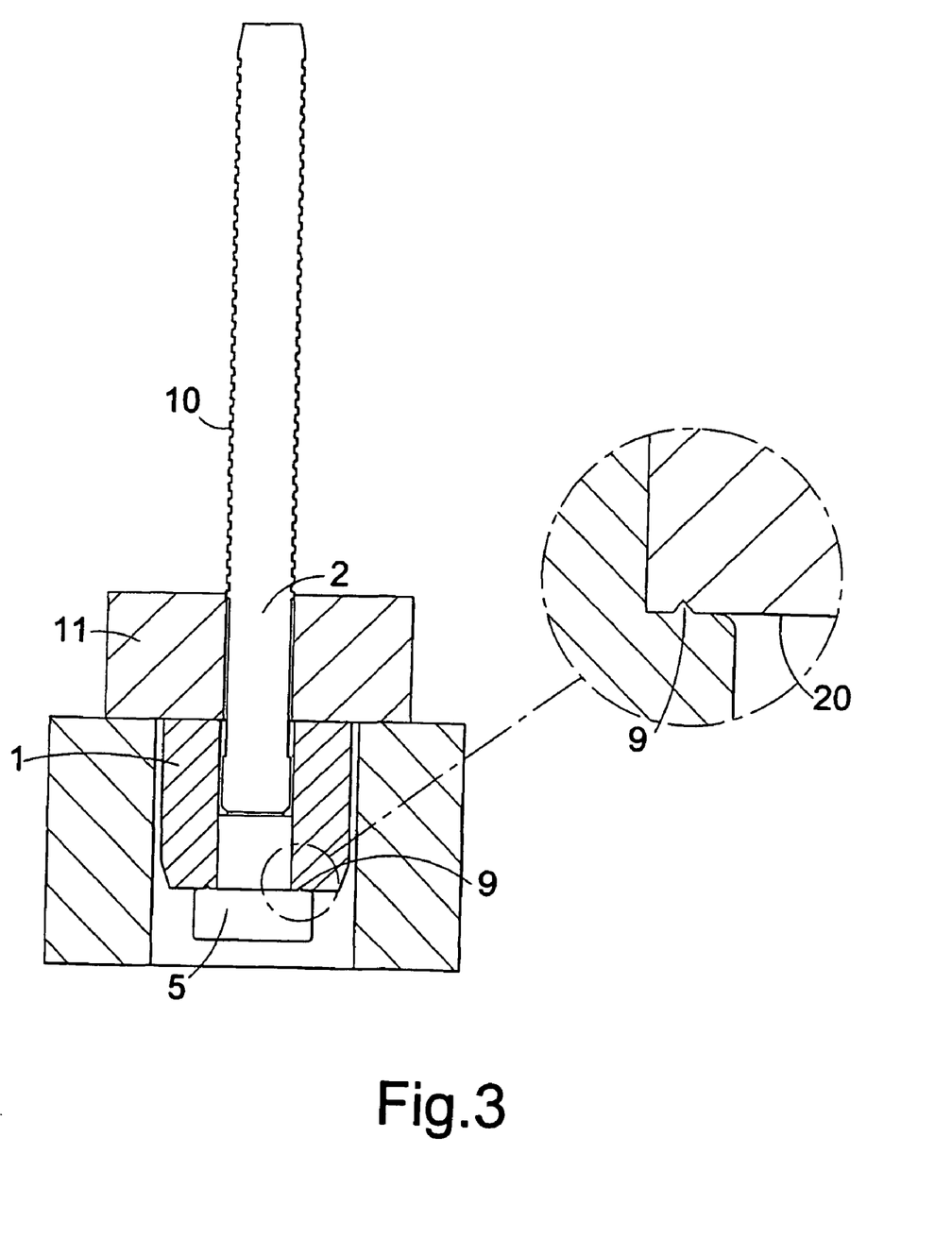

Thus, referring to FIG. 3, when the tool is operated, the stem 2 is drawn into the nosepiece 11 and thus the stem head enlarged portion 5 is drawn towards the tool nosepiece 11. The initial effect of this is to force the stem head annular projecting ring 9 into the end face 20 of the sleeve 1, as illustrated in the enlarged part of FIG. 3.

Figure 4:
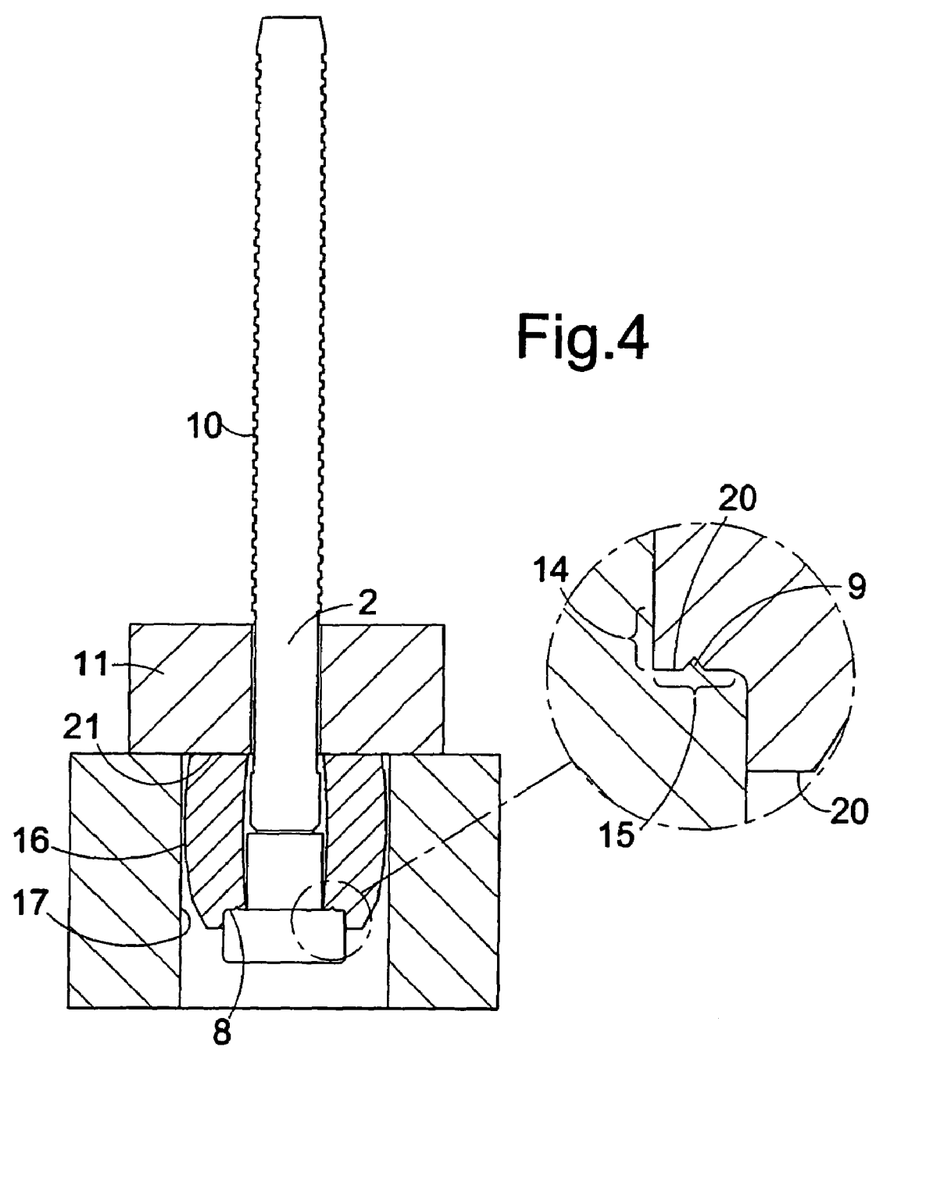

As the pulling force increases, the compressive force between the shoulder 8 of the stemhead and the nosepiece 11 increases, causing the sleeve 1 to expand radially. The sleeve initially expands radially in a barrel-shape (as illustrated in FIG. 4), because the forward end face 21 of the sleeve 1 is partially constrained against radial expansion by the frictional force between it and the nosepiece 11, and the other end face 20 of the sleeve is partially contrained against radial expansion by its engagement with the annular ring 9 on the shoulder 8 of the stem head. The force exerted by the shoulder 8 on the sleeve 1 is so great as to cause the stem head to impress into the end of the sleeve as illustrated in FIG. 4. This creates intimate contact between the shoulder on the stem and the sleeve end face 20.

Figure 5:
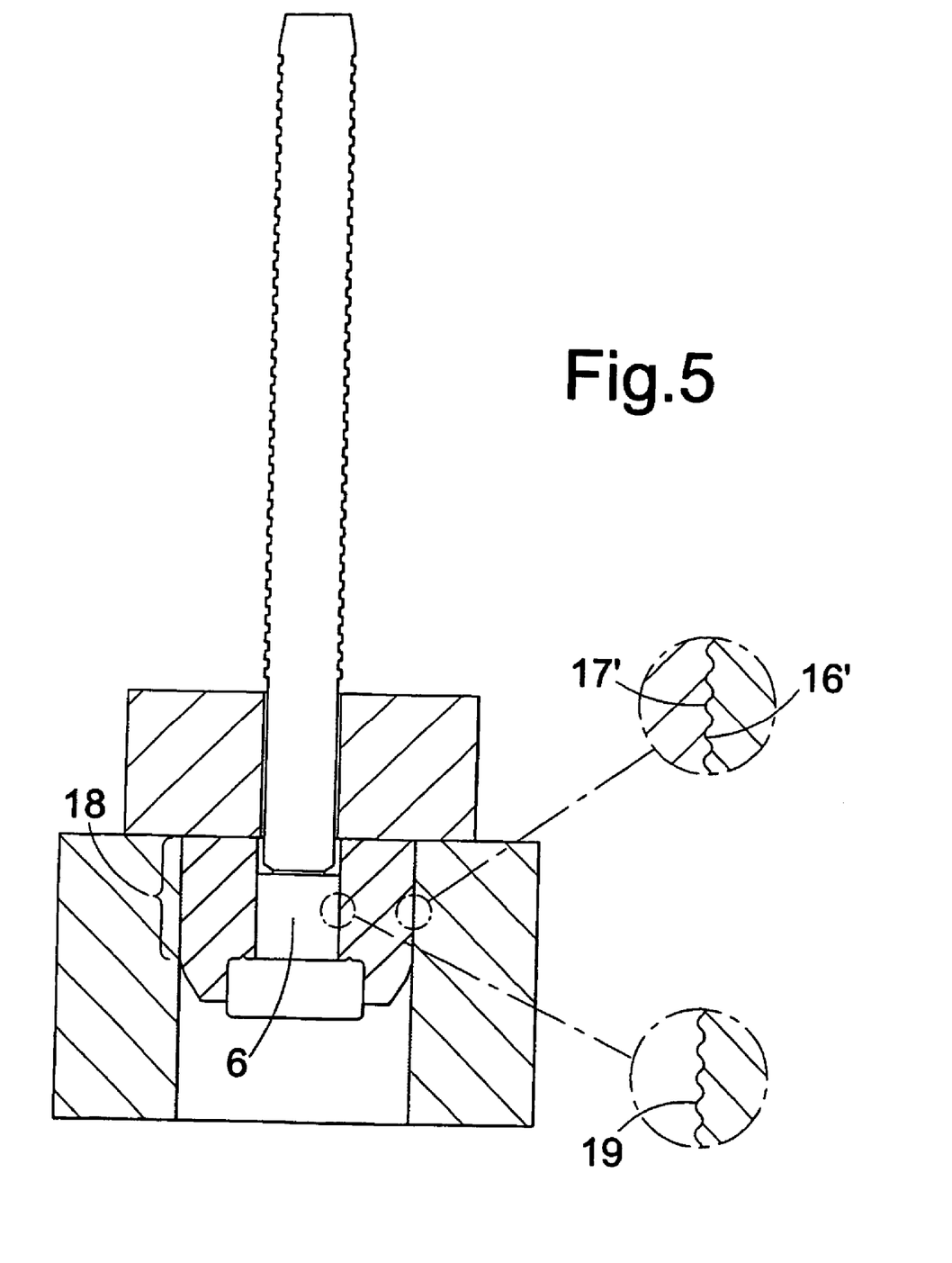

The annular ring 9 is effective in maintaining intimate contact between the stem and the sleeve in zones 14 and 15, indicated in the enlarged part of FIG. 4. As the pulling force further increases, the stem shoulder 8 further compresses into the sleeve, and the sleeve diameter further expands, until its peripheral surface 16 contact the hole surface 17. As the pulling force still further increases, the stem head 4 further compresses into the sleeve, which causes an increase in the compressive force in the sleeve material and a consequential increase in the radial force urging the sleeve to expand. As illustrated in FIG. 5, this increases the contact area 18 between the sleeve peripheral surface 16' and the hole surface 17'. The pressure between the two surfaces 16' and 17' is increased until the two are in intimate surface contact. The increased radial pressure also brings surface 19 of the bore of the sleeve into intimate contact with the surface of portion 6 of the head.

This intimate contact between the head portion 6 and the bore of the sleeve is effective to prevent any recoil of the stem head 4 when the breakneck 3 of the stem eventually fractures at a predetermined tension load. Thus the stem head 4 is retained within the sleeve without any relative axial movement between the two, upon fracture of the breakneck. The intimate contact between the stem and sleeve in zones 14 and 15, and between the peripheral surface of the sleeve and the hole over the zone 18 is maintained.

Figure 6:
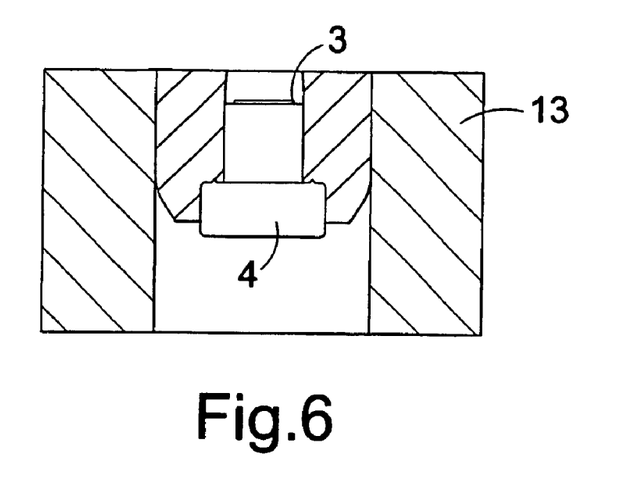

The position of the breakneck 3 is such that, upon completion of the installation operation, the break surface of the stem head 4 is always below the surface of the workpiece, as illustrated in FIG. 6.

The sealing plug of the foregoing example will provide effective sealing of a hole which has a relatively large clearance between the uninstalled plug and the hole, to facilitate easy insertion of the plug into the hole.

This is achieved because of the relatively large amount of radial expansion of the sleeve. Consequently the plug can be inserted into the hole without the need for extremely accurate alignment, in the radial direction of the axes of the plug and hole. Once the plug is inserted into the hole, even if there is some mis-alignment in the radial direction between the plug and the hole, the plug can be satisfactorily installed because a resilient compliance device can be incorporated between the workpiece and the installation tool. Thus as the plug expands, during the installation operation, the compliance device allows the plug to align radially with the hole.

The plug of the foregoing example is capable of expanding sufficiently and sealing a hole which is significantly larger than the pre-installed diameter of the plug and which is capable of sealing the hole against approximately the same level of fluid pressure as the previously referred to prior art plugs in a correspondingly smaller hole. For example, it has been determined by experiment that a plug in accordance with the foregoing example, which has an initial body diameter of 9 mm, can be installed in a hole of 10 mm diameter so that the installed plug is capable of withstanding a pressure in excess of 1000 bar. This compares with a prior art plug of 9 mm diameter which can withstand this level of pressure only when installed in a hole of diameter not exceeding 9.4 mm.

Figure 7:
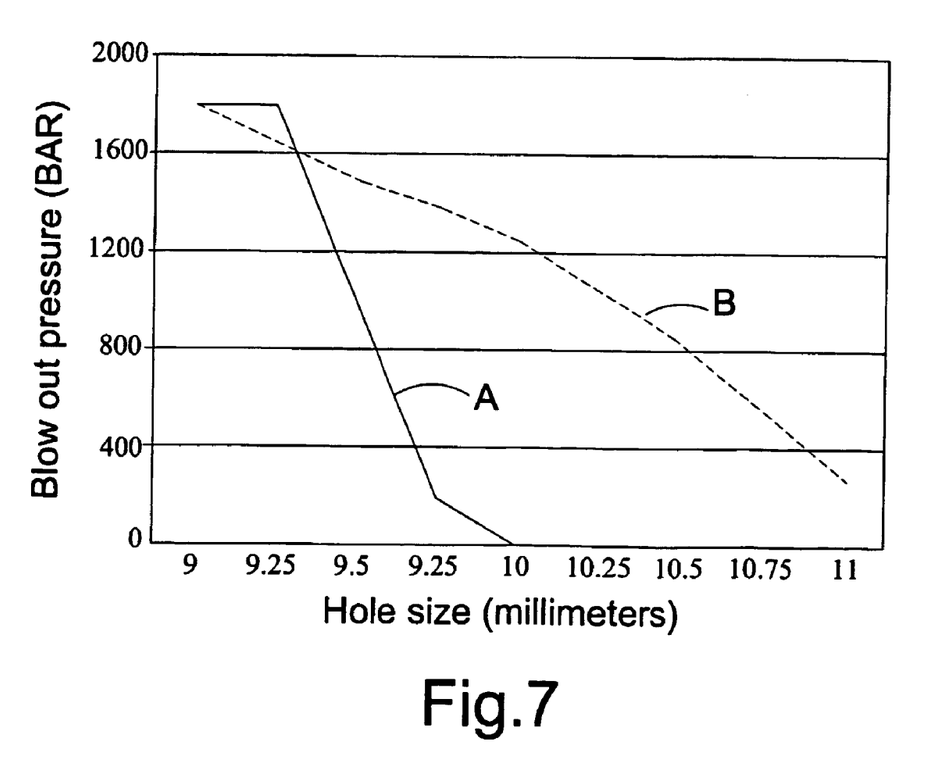
FIG. 7 is a graph showing the comparative properties of a prior art plug and the plug of the present example.
Figure 8:
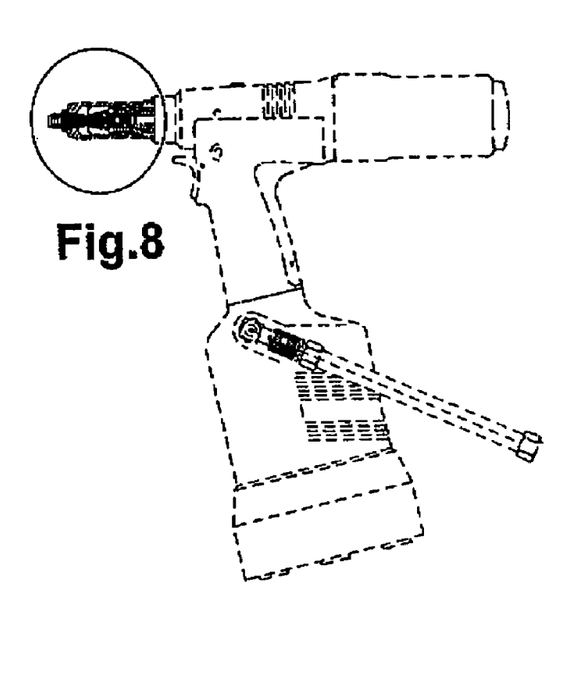
FIG. 8 shows a complete tool in dotted outline and FIG. 9 shows an enlarged portion of the encircled portion of FIG. 8.
Figure 9:
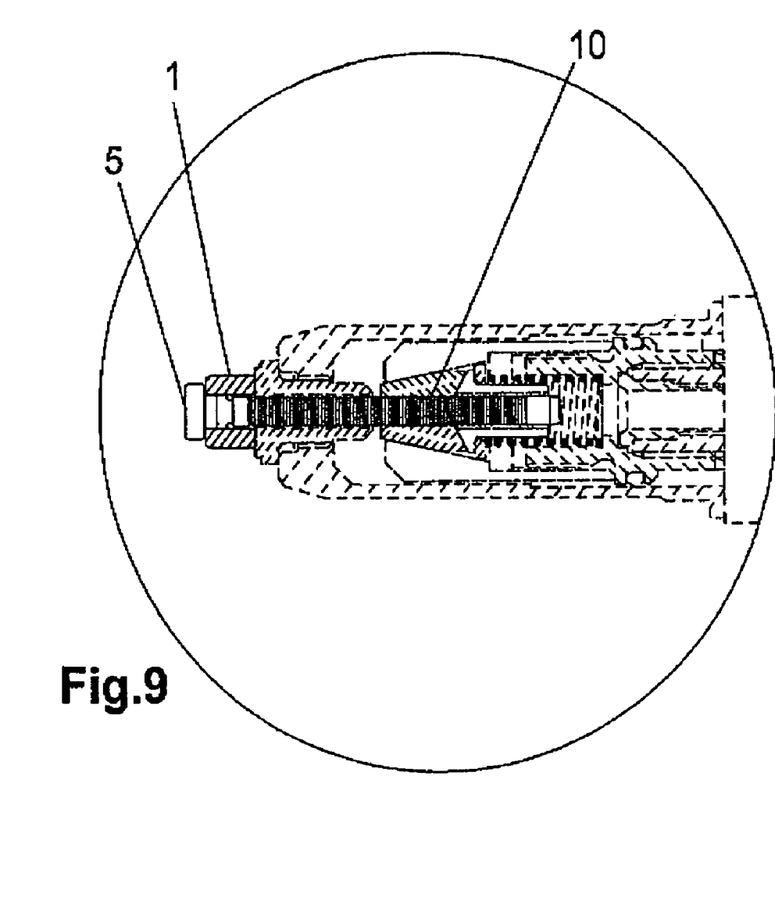

FIG. 7 illustrates by means of a graph the comparison of a sealing plug according to the foregoing example and a prior art sealing plug, both of diameter 9 mm. The graph plots the blow-out pressure in bars of the installed plug against the diameter of the hole in millimeters from 9 mm upwards. Graph A (solid line) shows the results for a prior-art plug of the type referred to. Graph B (broken line) shows the results for the plug according to the foregoing example. The present plug is useful over a range of diameter difference more than twice that of a prior art plug, and over the vast majority of that range provides a substantially higher blow-out pressure than the prior art plug.

The invention is not restricted to the details of the forgoing example. For instance, the stem head may be provided with a plurality of annular protrusions instead of the single one described. The cross-section of the or each protrusion could be other than tapering.

The head of the stem may be provided with a locking portion of reduced cross-sectional dimension (e.g. an annular groove) whereby, when the sleeve is deformed during installation, material of the sleeve at least partially enters the locking portion, to entrance locking of the head into the sleeve.

The invention claimed is:

1. A sealing plug for blind installation in a hole thereby to plug and seal the hole, which sealing plug comprises:
   a sleeve with an internal bore;
   a stem having a head at least part of which is radially enlarged with respect to the remainder of the stem;
   the stem head having a shoulder with an external diameter larger than the internal diameter of the sleeve bore, the shoulder being provided with at least one annular protrusion extending towards the sleeve when the stem is inserted into said bore;
   the stem protruding from one end of the sleeve, and the at least one annular protrusion abutting the other end of the sleeve;
   the stem being of a material which is harder than that of the sleeve and being formed with a weakened portion intermediate the head and the part of the stem remote therefrom;
   whereby, when the sealing plug is inserted in a hole having a sidewall, and increasing force is applied to the stem with respect to the sleeve, axial compression is applied by the shoulder to the sleeve material abutting it, thereby causing the annular protrusion on the stem head to embed into the sleeve, and the sleeve to deform and expand radially to engage with the sidewall of the hole, and thereafter the stem breaks at the weakened portion so that the head remains in the sleeve.

2. A sealing plug as claimed in claim 1, in which the at least one annular protrusion is of tapering cross-section in a plane passing through the major axis of the stem.

3. A sealing plug as claimed in claim 1, in which the shoulder of the stem head contains a plurality of annular protrusions.

4. A sealing plug as claimed in claim 2, in which the shoulder of the stem head contains a plurality of annular protrusions.

* * * * *